US012631208B2

(12) United States Patent
Gurvich et al.

(10) Patent No.: US 12,631,208 B2
(45) Date of Patent: May 19, 2026

(54) FLEXIBLE COMPOSITE DRIVE SHAFT

(71) Applicant: Goodrich Corporation, Charlotte, NC (US)

(72) Inventors: Mark R. Gurvich, Middletown, CT (US); Michael J. King, Sauquoit, NY (US); Brayton Reed, New York Mills, NY (US); Joyel Schaefer, Earlville, NY (US)

(73) Assignee: GOODRICH CORPORATION, Charlotte, NC (US)

( * ) Notice: Subject to any disclaimer, the term of this patent is extended or adjusted under 35 U.S.C. 154(b) by 373 days.

(21) Appl. No.: 18/165,547

(22) Filed: Feb. 7, 2023

(65) Prior Publication Data

US 2024/0110592 A1 Apr. 4, 2024

Related U.S. Application Data

(60) Provisional application No. 63/411,946, filed on Sep. 30, 2022.

(51) Int. Cl.
*F16C 3/02* (2006.01)
*B29C 70/24* (2006.01)
(Continued)

(52) U.S. Cl.
CPC .............. *F16C 3/026* (2013.01); *B29C 70/24* (2013.01); *B32B 5/02* (2013.01); *B29L 2031/75* (2013.01);
(Continued)

(58) Field of Classification Search
CPC .. B23B 5/02; B23B 5/26; B29C 70/24; B29L 2031/75; F16C 3/026; F16C 7/026;
(Continued)

(56) References Cited

U.S. PATENT DOCUMENTS 3,651,661 A * 3/1972 Darrow ................... F16C 3/026
464/181
4,089,190 A * 5/1978 Worgan ................... F16C 3/026
464/181
(Continued)

FOREIGN PATENT DOCUMENTS

DE 3641632 A1 * 6/1988 .............. F16C 7/026
DE 4111286 A1 * 10/1991 .............. F16C 3/026
(Continued)

OTHER PUBLICATIONS

European Application No. 23201017.3 filed Sep. 29, 2023; Extended European Search Report dated Jan. 9, 2024; 9 pages.
(Continued)

*Primary Examiner* — Josh Skroupa
(74) *Attorney, Agent, or Firm* — CANTOR COLBURN LLP

(57) ABSTRACT

A composite drive shaft includes a web-based body defining a longitudinal axis. The web-based body has a first composite layup end section, a second composite layup end section that is opposite to the first composite layup end section, a first spiral composite element extending between the first composite end section and the second composite layup end section, and a second spiral composite element extending between the first composite end section and the second composite layup end section. The first spiral composite element and the second composite spiral element are embedded into the first composite layup end section, and the second composite layup end section. The first composite spiral element and the second composite spiral element are arranged in a bi-directional orientation relative to the longitudinal axis. The first spiral composite element and the second spiral composite element are arranged at pre-deter-
(Continued)

mined angles and possess a uni-directional fiber-reinforced polymer-matrix composite structure.

19 Claims, 13 Drawing Sheets

(51) Int. Cl.
    *B29L 31/00*       (2006.01)
    *B32B 5/02*        (2006.01)
(52) U.S. Cl.
    CPC ...... *F16C 2208/02* (2013.01); *F16C 2326/43*
                         (2013.01)
(58) Field of Classification Search
    CPC .............. F16C 2208/02; F16C 2208/04; F16C
                          2326/06; F16C 2326/43
    USPC .................................................. 464/181, 183
    See application file for complete search history.

(56) References Cited

U.S. PATENT DOCUMENTS

| | | | | | |
|---|---|---|---|---|---|
| 4,275,122 | A | * | 6/1981 | Fisher | F16C 3/026 |
| | | | | | 403/42 |
| 4,421,497 | A | * | 12/1983 | Federmann | F16C 3/026 |
| | | | | | 464/181 |
| 4,605,385 | A | * | 8/1986 | Puck | F16C 3/026 |
| | | | | | 464/181 |
| 4,664,644 | A | * | 5/1987 | Kumata | F16C 3/026 |
| | | | | | 464/181 |
| 4,681,556 | A | * | 7/1987 | Palmer | F16C 3/026 |
| | | | | | 464/181 |
| 4,693,281 | A | * | 9/1987 | Creedon | F16L 11/083 |
| | | | | | 138/DIG. 2 |
| 4,863,416 | A | * | 9/1989 | Gupta | F16C 3/026 |
| | | | | | 464/181 |
| 5,342,464 | A | * | 8/1994 | McIntire | F16C 3/026 |
| | | | | | 464/181 |
| 5,683,300 | A | * | 11/1997 | Yasui | F16C 3/026 |
| | | | | | 464/181 |
| 5,851,152 | A | * | 12/1998 | Ilzhofer | F16C 3/026 |
| | | | | | 464/181 |
| 7,731,593 | B2 | * | 6/2010 | Dewhirst | F16C 3/026 |
| | | | | | 464/181 |
| 8,690,692 | B2 | * | 4/2014 | Buchin | F16C 3/026 |
| | | | | | 464/181 |
| 9,157,470 | B2 | * | 10/2015 | Uhl | F16C 7/026 |
| 9,303,682 | B2 | * | 4/2016 | Sohl | F16C 3/026 |
| 9,909,624 | B2 | | 3/2018 | Narayanan Nampy et al. | |
| 10,344,794 | B2 | * | 7/2019 | Slesinski | F16C 3/026 |
| 11,371,549 | B2 | * | 6/2022 | Gurvich | F16C 3/026 |
| 2017/0082137 | A1 | | 3/2017 | Narayanan Nampy et al. | |
| 2023/0095420 | A1 | | 3/2023 | Gurvich et al. | |

FOREIGN PATENT DOCUMENTS

| | | | | | |
|---|---|---|---|---|---|
| DE | 102009036509 | A1 | * | 4/2011 | ............. F16C 3/026 |
| EP | 0222660 | A1 | * | 5/1987 | ............. F16C 3/026 |
| EP | 3809003 | A1 | | 4/2021 | |
| FR | 2554188 | A1 | | 5/1985 | |
| FR | 2613790 | A1 | * | 10/1988 | ............. F16C 3/026 |
| GB | 2149061 | A | * | 6/1985 | ................ F16C 3/02 |
| JP | 59109315 | A | * | 6/1984 | ............. F16C 3/026 |
| JP | 59137613 | A | * | 8/1984 | ............. F16C 3/026 |
| JP | 63199915 | A | * | 8/1988 | ............. F16C 3/026 |
| JP | 01108031 | A | * | 4/1989 | ............. F16C 3/026 |
| JP | 05087118 | A | * | 4/1993 | ................ F16C 3/02 |
| WO | WO-8912759 | A1 | * | 12/1989 | ............. F16C 3/026 |

OTHER PUBLICATIONS

"Automated Fiber Placement", pp. 1-34, retrieved Apr. 18, 2025, retrieved from https://www.google.com/search?q=automated+fiber+placement&rlz=1C1GCEA_enUS932US932&source=lnms&tbm=isch&sa=X&ved=2ahUKEwiG3dLMtO37AhUOgnIEHUtODVEQ_AUoAXoECAIQAw&cshid=1670619130307358&biw=1395&bih=747&dpr=1.1&safe=active&ssui=on.

* cited by examiner

FLEXIBLE COMPOSITE DRIVE SHAFT

CROSS-REFERENCE TO RELATED APPLICATIONS

This application claims the benefit of U.S. Provisional Application No. 63/411,946 filed Sep. 30, 2022, the disclosure of which is incorporated herein by reference in its entirety.

BACKGROUND

Exemplary embodiments pertain to the art of drive shafts and, more particularly, to a flexible composite drive shaft.

In certain installations, multiple drive shafts are employed to connect a main rotor engine to a tail rotor in a rotary wing aircraft. The drive shafts are connected one to another by flexible diaphragm couplings. Although drive shafts primarily transfer torsional load, flexibility of the couplings is also desirable in order to compensate for potential lateral or/and axial mutual movements during service or to accommodate any geometrical imperfections that may be created upon drive shaft installation. The flexible diaphragm couplers are usually formed from multiple metallic plates that are welded together.

Such metallic couplers are typically expensive and labor-intensive to fabricate. Their approval for use in aircraft systems is based on strict quality standards. Thus, drive shafts having an integrated capability of bending and axial flexibilities would significantly reduce cost and enhance structural efficiency of such components.

BRIEF DESCRIPTION

Disclosed is a composite drive shaft including a web-based body defining a longitudinal axis. The web-based body has a first composite layup end section, a second composite layup end section that is opposite to the first composite layup end section, a first spiral composite element extending between the first composite end section and the second composite layup end section, and a second spiral composite element extending between the first composite end section and the second composite layup end section. The first spiral composite element and the second composite spiral element are embedded into the first composite layup end section, and the second composite layup end section. The first composite spiral element and the second composite spiral element are arranged in a bi-directional orientation relative to the longitudinal axis. The first spiral composite element and the second spiral composite element are arranged at pre-determined angles and possess a uni-directional fiber-reinforced polymer-matrix composite structure.

Additionally, or alternatively, in this or other non-limiting examples the pre-determined angle is between about 35° and about 55° relative to the longitudinal axis.

Additionally, or alternatively, in this or other non-limiting examples each of the first spiral composite element and the second spiral composite element include a uniform cross-section.

Additionally, or alternatively, in this or other non-limiting examples at least one of the first spiral composite element and the second spiral composite element include a non-uniform cross-section.

Additionally, or alternatively, in this or other non-limiting examples the web-based body includes a first end, a second end, and a shaft portion extending between the first end and the second end, the first composite layup end section being arranged at the first end, the second composite layup end section being arranged at the second end and the bi-directional orientation of the first spiral composite element and the second spiral composite element extending across the shaft portion between the first end and the second end.

Additionally, or alternatively, in this or other non-limiting examples the first composite layup end and the second composite layup have a bending stiffness along the longitudinal axis that is greater than the bending stiffness along the longitudinal axis of remaining portions of the web-based body.

Additionally, or alternatively, in this or other non-limiting examples at least one of the first composite layup end and the second composite layup end is formed from at least three distinct fiber orientations.

Additionally, or alternatively, in this or other non-limiting examples at least one of the at least three distinct fiber orientations has an angle of between about +35° and about +55° and another of the at least three distinct fibers has an angle of between about −55° and about −35° relative to the longitudinal axis.

Additionally, or alternatively, in this or other non-limiting examples the web-based body includes plies overlaid onto plies of the first spiral composite element and the second spiral composite element and plies arranged below the first spiral composite element and the second spiral composite element.

Additionally, or alternatively, in this or other non-limiting examples rigid composite rings are arranged on the shaft portion, the rigid composite rings being uni-directionally reinforced along a hoop axis.

Additionally, or alternatively, in this or other non-limiting examples the first composite element is connected to the second spiral composite element through at least one joint.

Additionally, or alternatively, in this or other non-limiting examples the first spiral composite element is interwoven with the second spiral composite element at the joint.

Additionally, or alternatively, in this or other non-limiting examples the joint includes a plurality of joints spaced at defined intervals across the web-based body.

Additionally, or alternatively, in this or other non-limiting examples the joint includes reinforcing pads.

Additionally, or alternatively, in this or other non-limiting examples at least one of the first spiral composite element and the second spiral composite element is formed from a plurality of fibers.

Additionally, or alternatively, in this or other non-limiting examples the plurality of fibers includes at least one of a carbon fiber, a glass fiber, and an organic fiber.

Additionally, or alternatively, in this or other non-limiting examples the plurality of fibers is impregnated with a polymer matrix material including one of a thermoplastic matrix and a thermoset matrix.

Additionally, or alternatively, in this or other non-limiting examples an aircraft includes the composite drive shaft as described herein.

Also disclosed is a method of forming the composite drive shaft as described herein includes impregnating the fibers with a polymeric matrix, manually laying fibers onto a mandrel, and hardening a fiber band on the mandrel by one of curing a thermoset polymeric matrix and solidifying a thermoplastic polymeric matrix to form the composite drive shaft.

Further disclosed is a method of forming the composite drive shaft as described herein includes activating an automatic fiber placement (AFP) system, impregnating the fiber band with a polymetric matrix, deploying a fiber band onto a mandrel with the AFP system, depositing the fiber band onto the mandrel to form the composite drive shaft, and hardening the fiber band on the mandrel by one of curing a thermoset polymeric matrix and solidifying a thermoplastic polymeric matrix to form the composite drive shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
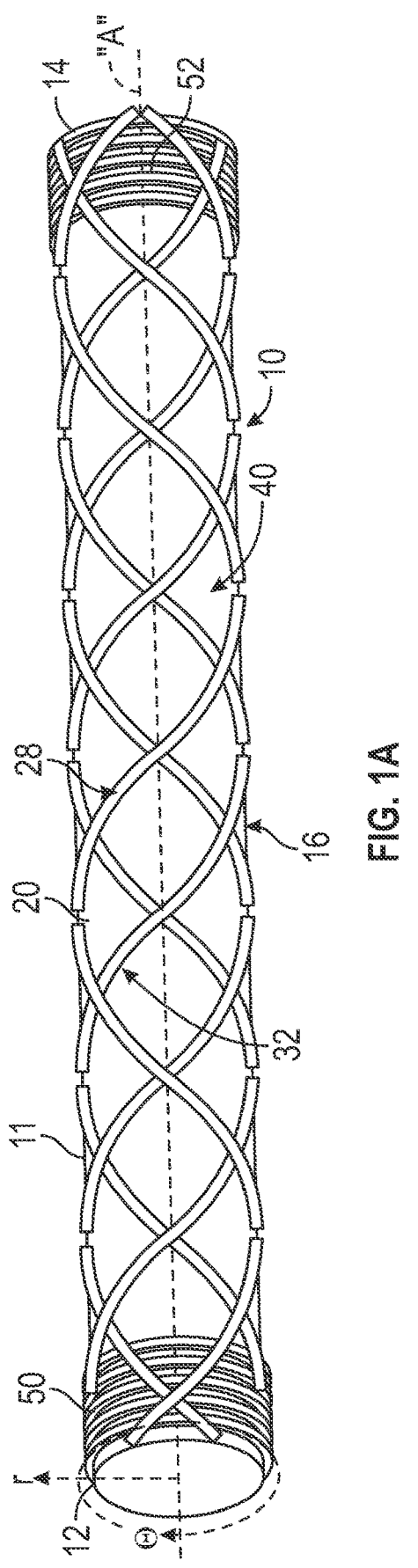
FIG. 1A depicts a perspective side view of a composite drive shaft, in accordance with a non-limiting example.
Figure 4:
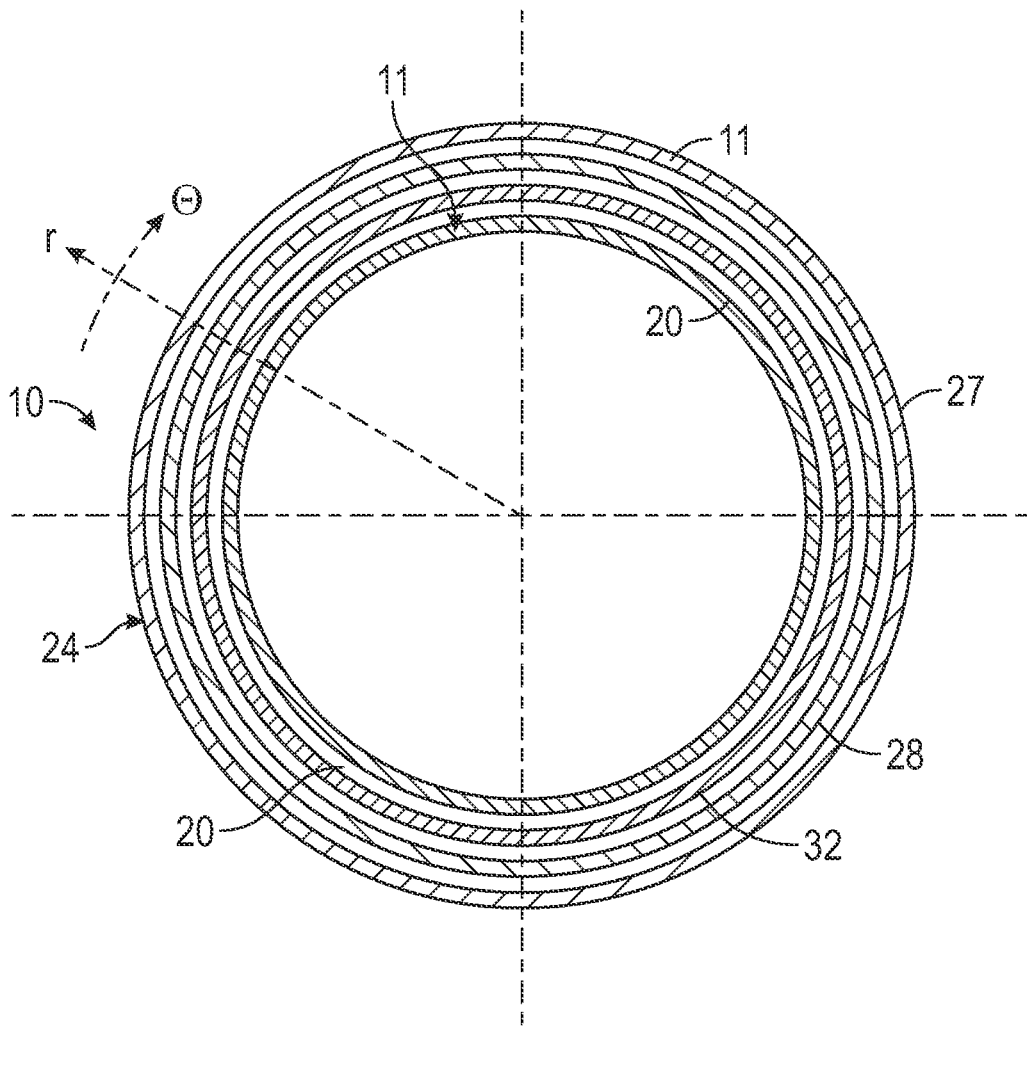
FIG. 4 is a diametrical cross-sectional view of an end section of the composite drive shaft of FIG. 1A, in accordance with a non-limiting example.

A composite drive shaft, in accordance with a non-limiting example, is shown at 10 in FIG. 1A. Composite drive shaft 10 includes a web-based body 11 having a first end 12, a second end 14, and a shaft portion 16 extending along an axial axis "A" between first end 12 and second end 14. Shaft portion 16 includes an outer surface 20. Web-based body 11 may be formed from a plurality of composite plies 24 as shown in FIG. 4. Composite drive shaft 10 includes a first spiral composite element 28 extending along outer surface 20 in a first direction and a second spiral composite element 32 extending along outer surface 20 in a second direction.

Figure 1B:
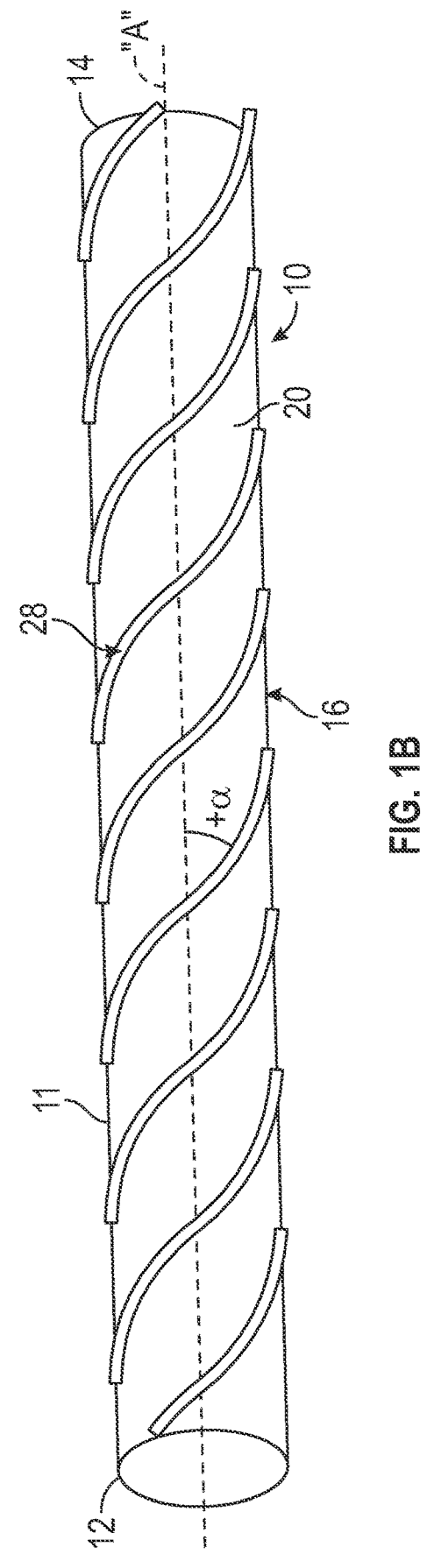
FIG. 1B depicts a perspective side view of a first plurality of spiral elements of the composite drive shaft of FIG. 1A, in accordance with a non-limiting example.
Figure 1C:
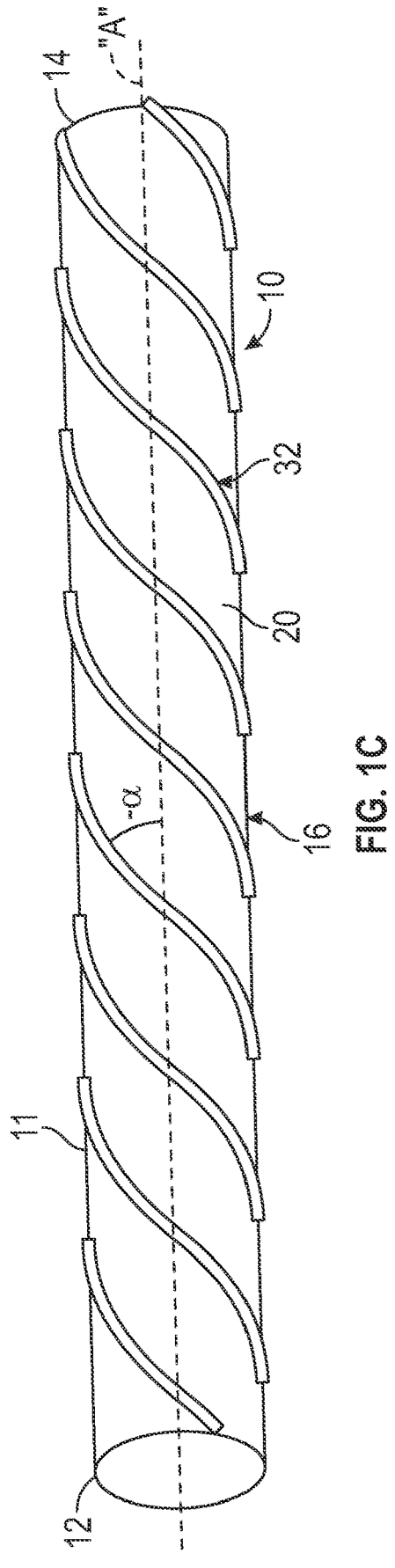
FIG. 1C depicts a perspective side view of a second plurality of spiral elements of the composite drive shaft of FIG. 1A, in accordance with a non-limiting example.
Figures 2A, 2B:
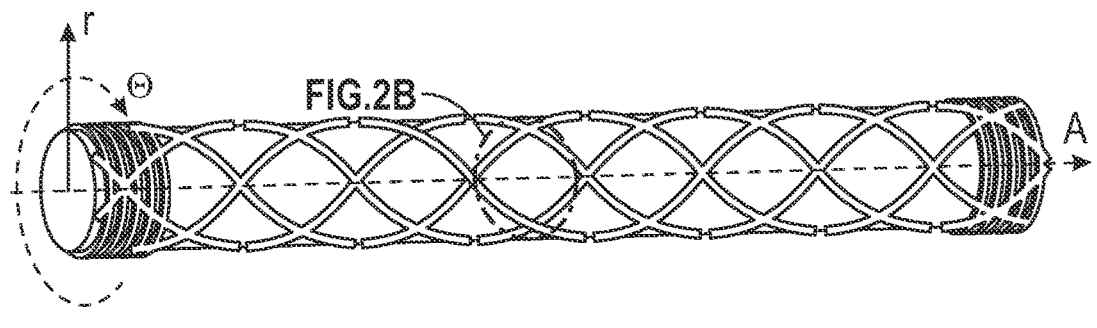
FIG. 2A depicts a perspective side view of a drive shaft having a spiral net formed from a repeated segments of a spiral net of the composite drive shaft of FIG. 1A, in accordance with a non-limiting example.
FIG. 2B is a two-dimensional side view of one of the repeated segments of the spiral net of FIG. 2A shown before deformation.
Figure 2C:
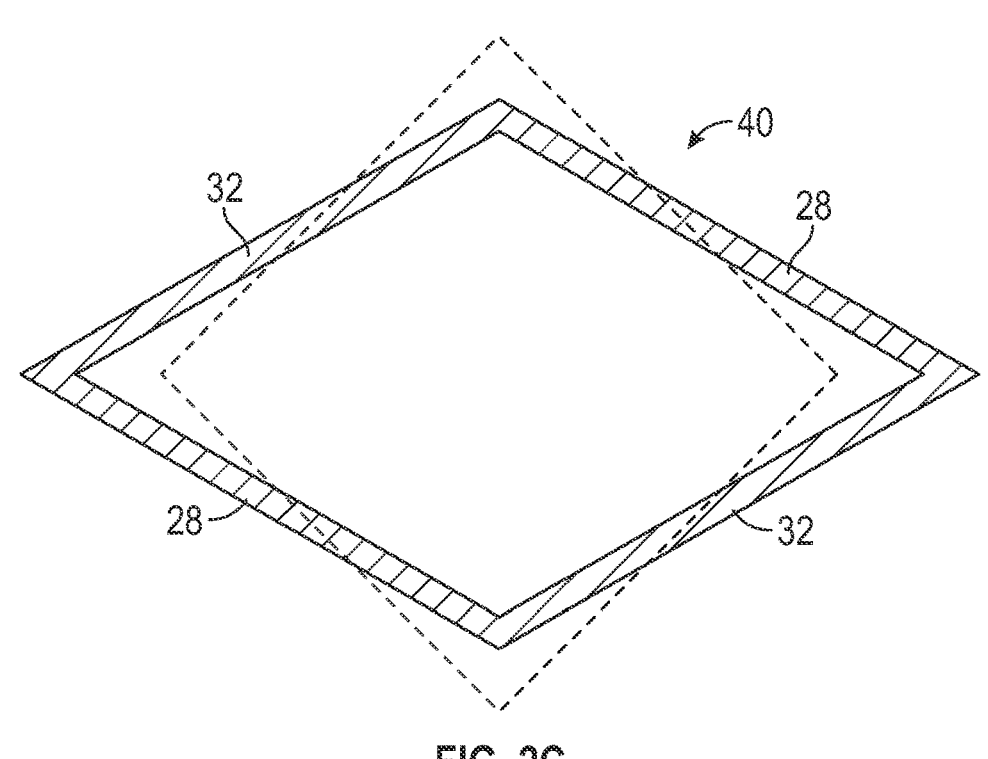
FIG. 2C is a two-dimensional side view of the one of the repeated segments of the spiral net of FIG. 2B under axial tension, in accordance with a non-limiting example.
Figure 2D:
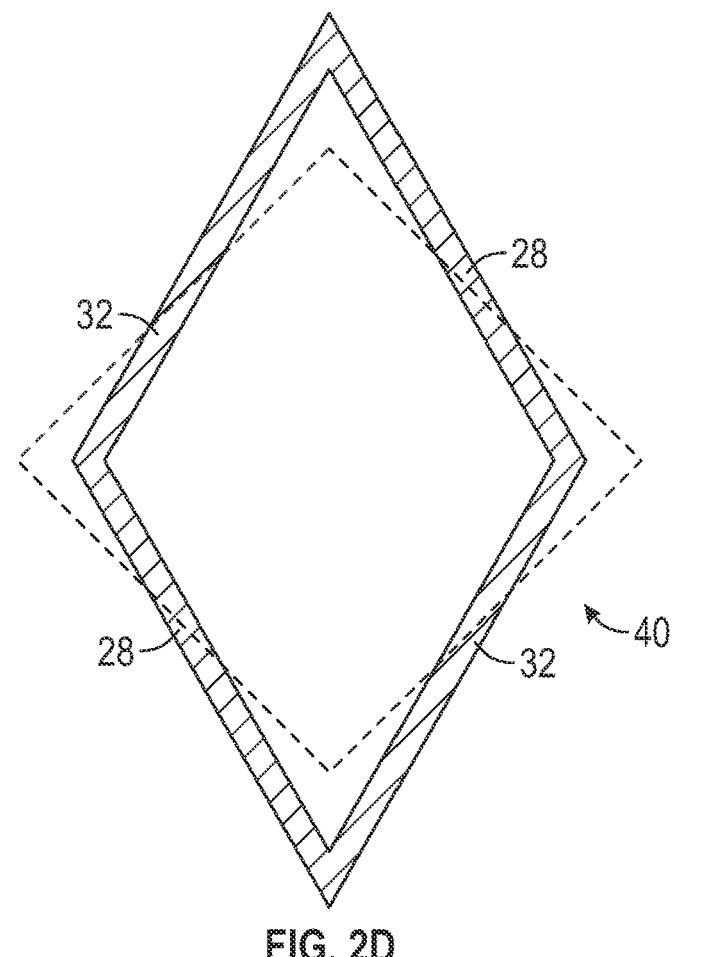
FIG. 2D is a two-dimensional side view of the one of the repeated segments of the spiral net of FIG. 2B under axial compression, in accordance with a non-limiting example.
Figure 2E:
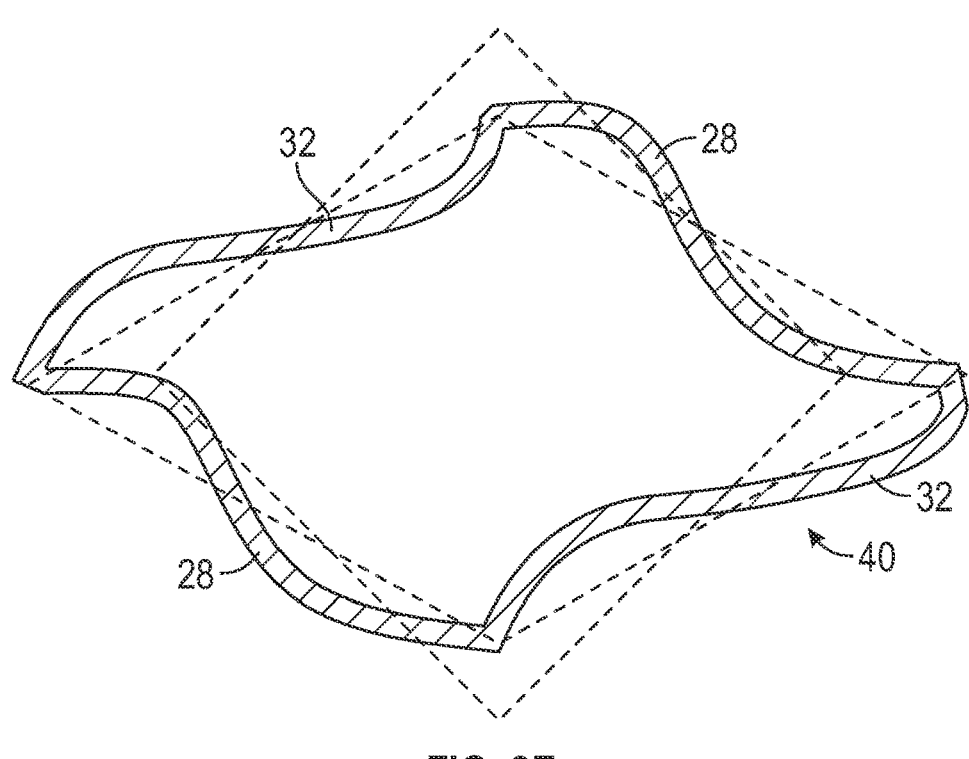
FIG. 2E is a two-dimensional side view of the one of the repeated segments of the spiral net of FIG. 2B under axial tension, in accordance with another non-limiting example.
Figure 2F:
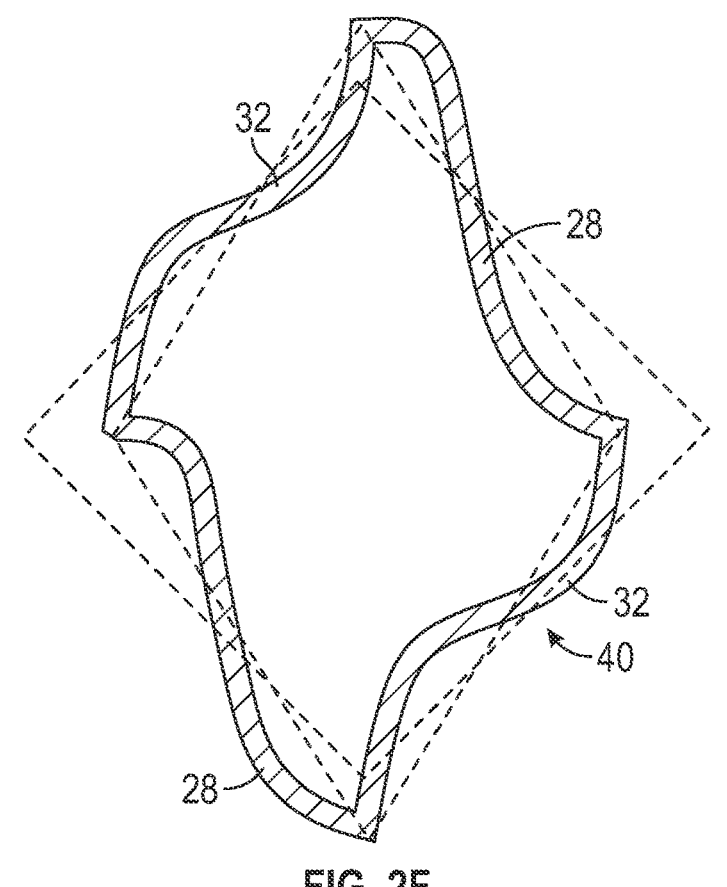
FIG. 2F is a two-dimensional side view of the one of the repeated segments of spiral net of FIG. 2B under axial compression, in accordance with yet another non-limiting example.

In a non-limiting example, first spiral composite element 28 overlaps second spiral composite element 32 forming a spiral net 40. Spiral net 40 supports composite drive shaft 10 under torsion and provides flexibility under axial tension or axial compression as shown in FIGS. 2A-2D. Variants shown in FIGS. 2E-2F show schematically deformation under axial tension and compression, respectively, in cases of relatively stiff joining between spiral elements of the opposite directions. In these cases (FIGS. 2E, 2F), some Q-r in-plane bending can be expected. First spiral composite element 28 extends along outer surface 20 at a first angle $+\alpha$ relative to axial axis "A" (FIG. 1B) and second spiral composite element 30 extends along outer surface 20 at a second angle $-\alpha$ relative to axial axis "A" (FIG. 1C). In a non-limiting example first angle +α is between about 35° and about 55°, and second angle –α is between –55° and –35°.

In a non-limiting example, first spiral composite element 28 and second composite spiral element 32 are formed from uni-directional fiber-reinforced polymer-matric composite structure as shown in FIGS. 2B and 2C-2F. Spiral composite elements 28 and 32 can have uni-directional continuous or discontinuous reinforcing fibers. Representative examples of the fibers can be, among others, carbon, glass or organic (e.g., Kevlar) fibers or any of their combinations. Thermoplastic or thermoset polymers can be representative examples of polymer matrices, among others. Different manufacturing methods, e.g., automated fiber placement (AFP) as will be detailed more fully herein or manual layups, for example, around a cylindrical metallic mandrel can be applied in different embodiments depending on available equipment and/or business objectives.

Figures 3A, 3B, 3C, 3D:
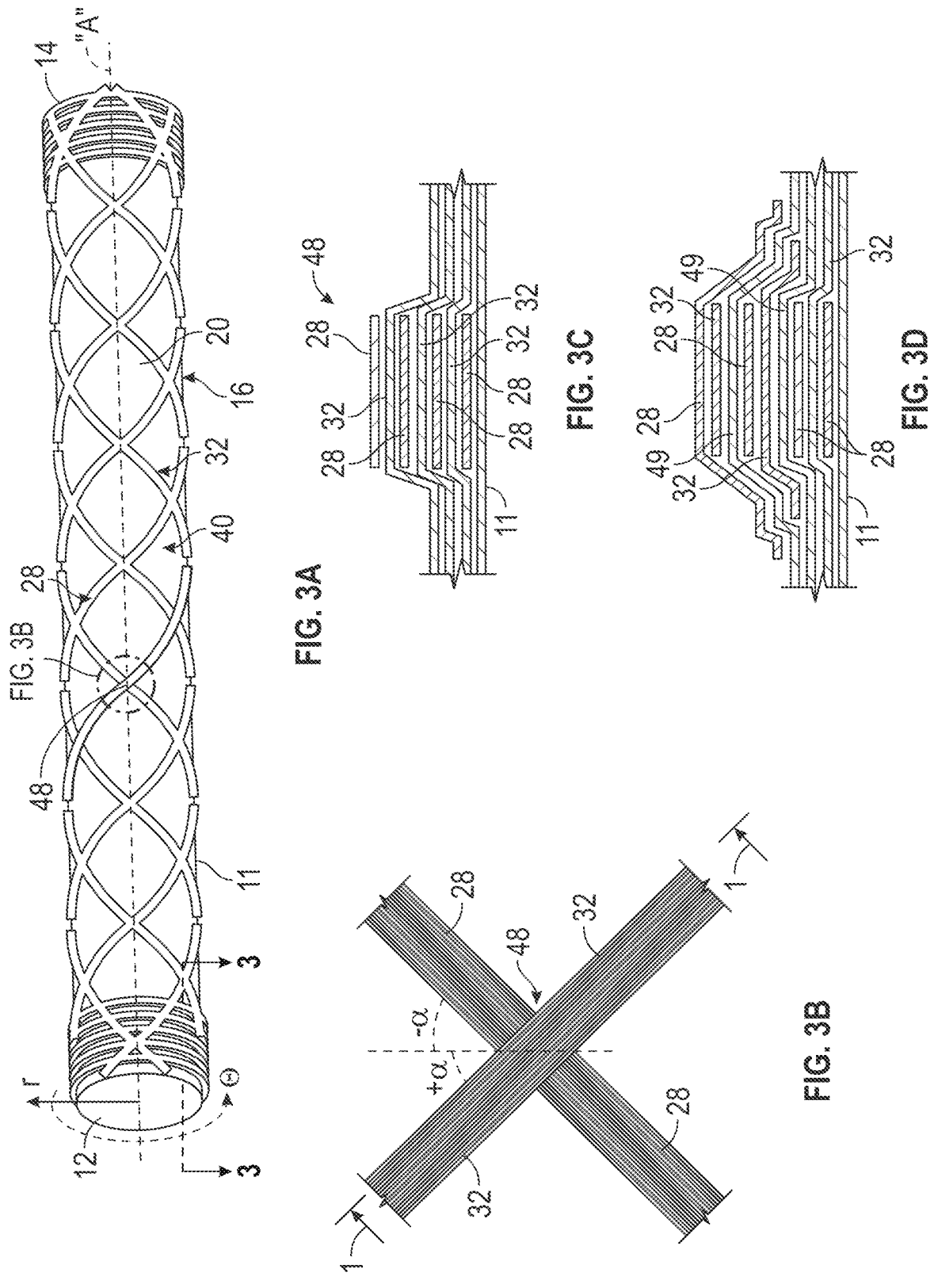
FIG. 3A is a perspective side view of the composite shaft of FIG. 1A depicting a joint between spiral elements, in accordance with a non-limiting example.
FIG. 3B is a two-dimensional side view of the joint of FIG. 3A, in accordance with a non-limiting example.
FIG. 3C is a cross-sectional view of the joint of FIG. 3B including reinforcing pads taken through the line 3-3 in FIG. 3A, in accordance with a non-limiting example.
FIG. 3D is a cross-sectional view of the joint of FIG. 3B including reinforcing pads taken through the line 3-3 in FIG. 3A, in accordance with another non-limiting example

Details of interconnecting joining of the spiral composite elements are shown in FIG. 3A-3D as representative examples. The uni-directional composite structure may be connected to form a plurality of periodic joints, or joints occurring at defined intervals between first end 12 and second end 14 such are shown at 48. Joint 48 may be formed by simply overlaying seconds spiral composite element 32 onto first composite spiral element 28 as shown in FIG. 3B or by interweaving fibers from first composite spiral joint 28 and second composite spiral element 32 as shown in FIGS. 3C and 3D. Joint 48 may be reinforced with a periodic joint as shown in FIG. 3C and/or may include reinforcing pads 49 as shown in FIG. 3D. Order and sequence of mutual positioning of individual layers of spiral elements 28 and 32 can vary in different embodiments depending, for example, on manufacturing efficiency and/or design preferences.

Figure 1D:
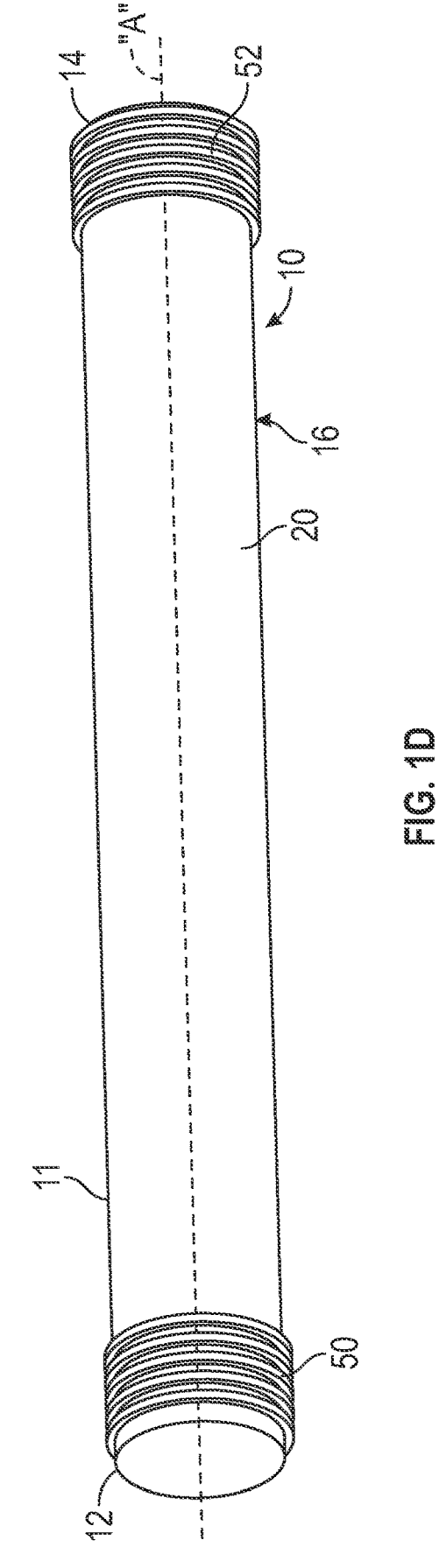
FIG. 1D depicts a perspective side view of end sections of the composite drive shaft of FIG. 1A, in accordance with a non-limiting example.

Further, incomposite drive shaft 10 includes a first composite layup end section 50 arranged at first end 12 and a second composite layup end section 50 arranged at second end 14 as shown in FIGS. 1A and 1D. First and second composite layup sections 50 and 52 form stiff composite ends of web-based body 18. That is, first composite layup end section 50 and second composite layup end section 52 establish a greater stiffness for corresponding ones of first end 12 and second end 14 relative to remaining portions of web-based body 11. In this manner, first and 12 and second end 14 may serve as mechanical interfaces between driving components and other driven components.

In a non-limiting example, first spiral composite element 28 and second composite spiral element 32 are embedded into first composite layup end section 50 and second composite layup end section 52. First composite layup end section 50 and second composite layup end section 52 possess an axial length that extends along axis "A" a distance so as to provide desired load transfer from first spiral composite element 28 and second composite spiral element 32.

In one non-limiting example, first spiral composite element 28 and second composite spiral element 32 may be embedded in the radial direction between inner and outer outside layers (not separately labeled) of first composite layup section 50 and second composite layup section 52. In another non-limiting example, first spiral composite element 28 and second composite spiral element 32 may be embedded in the hoop direction between individual layers (not separately labeled) of first composite layup end section 50 and second composite layup end section 52.

First composite layup end section 50 and second composite layup end section 52 include composite layers, placed in either hoop (circumferential) orientation, angles +a and –a, complimenting orientation of the spiral elements, other angles +b and –b, different from spiral orientations +a and –a, and 0-orientation parallel to the longitudinal axis of the shaft. The number of layers and their sequences may vary in different non-limiting examples. The term "layer" is defined as any combination of uni-directional composites, including continuous or discontinuous fibers. Sizes of layers, e.g., their thickness or width, may also vary in accordance with various non-limiting examples.

FIG. 4 shows is a generalized diametrical cross-sectional view of first layup end section 50 with an understanding that second layup end section 52 includes similar structure. First layup end section 50 includes first and second spiral composite elements 28 and 32 formed from a plurality of composite plies 24 of the web-based body 11. The plurality of plies 24 is placed around an outer surface (not separately labeled) of mandrel 20 and is embedded within the plurality of composite plies 27 at first end 12. Mandrel 20 is used during fabrication of composite drive shaft 10 is removed upon the completion of fabrication. Different variants of embedded designs of spiral elements 28 and 32 into end area plurality of plies 27 are illustrated, for example, below in FIGS. 5A-5H for portions of the end sections.

Figure 5C:
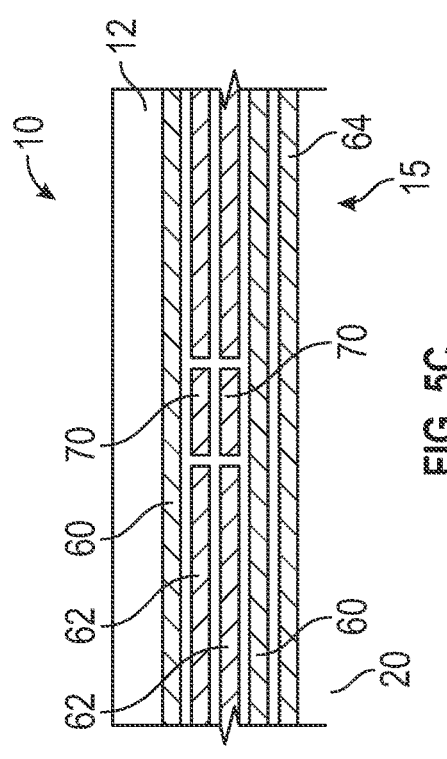
FIG. 5C is a diametrical cross-sectional view of a portion of the end section of the composite drive shaft of FIG. 4, in accordance with yet another non-limiting example.
Figure 5D:
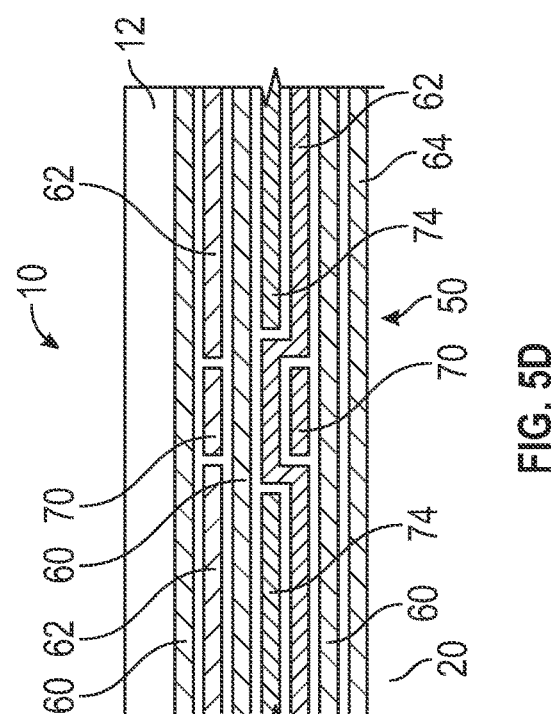
FIG. 5D is a diametrical cross-sectional view of a portion of the end section of the composite drive shaft of FIG. 4, in accordance with still yet another non-limiting example.
Figure 5A:
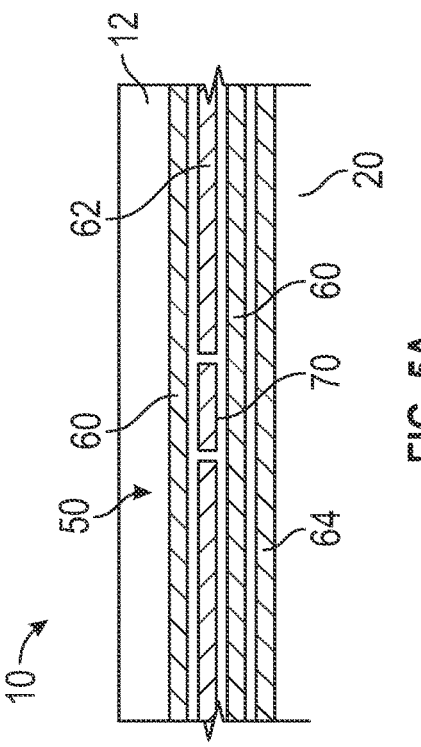
FIG. 5A is a diametrical cross-sectional view of a portion of the end section of the composite drive shaft of FIG. 4, in accordance with a non-limiting example.
Figure 5B:
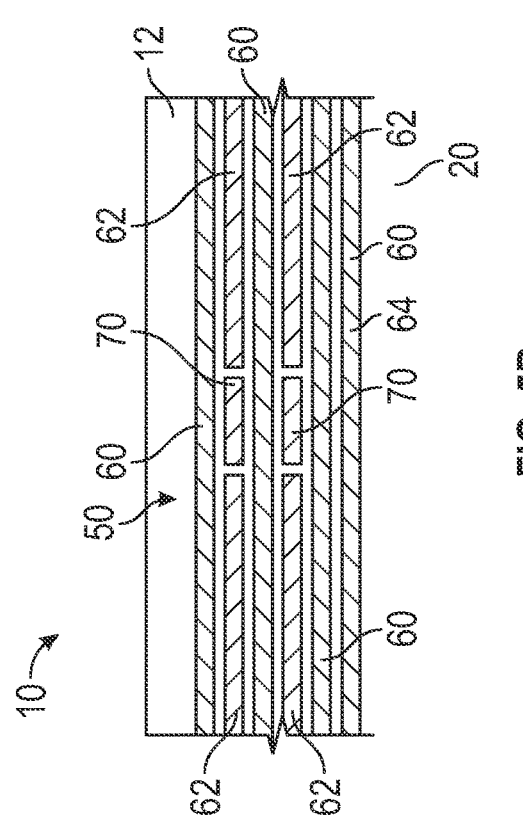
FIG. 5B is a diametrical cross-sectional view of a portion of the end section of the composite drive shaft of FIG. 4, in accordance with another non-limiting example.
Figure 5G:
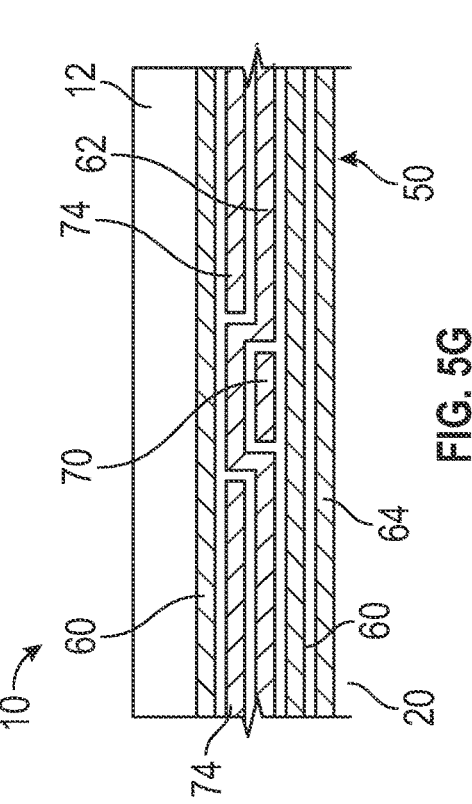
FIG. 5G is a diametrical cross-sectional view of a portion of the end section of the composite drive shaft of FIG. 4, in accordance with yet still another non-limiting example.
Figure 5H:
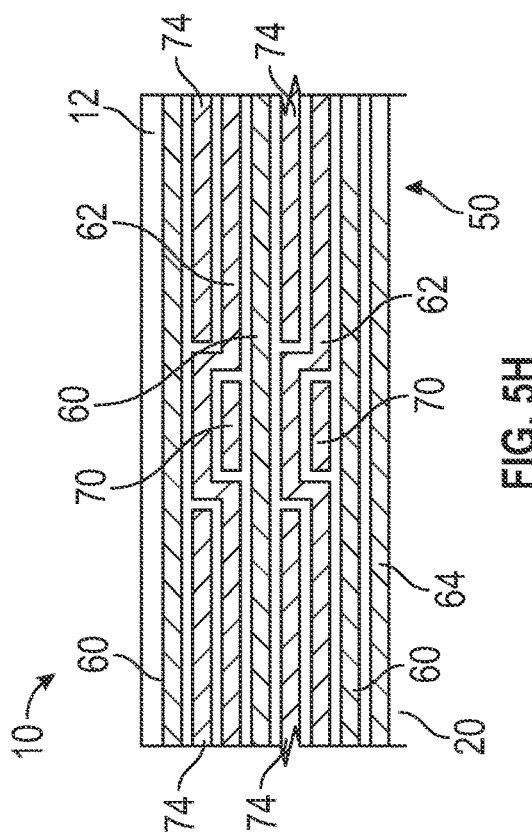
FIG. 5H is a diametrical cross-sectional view of a portion of the end section of the composite drive shaft of FIG. 4, in accordance with still yet another non-limiting example.
Figure 5E:
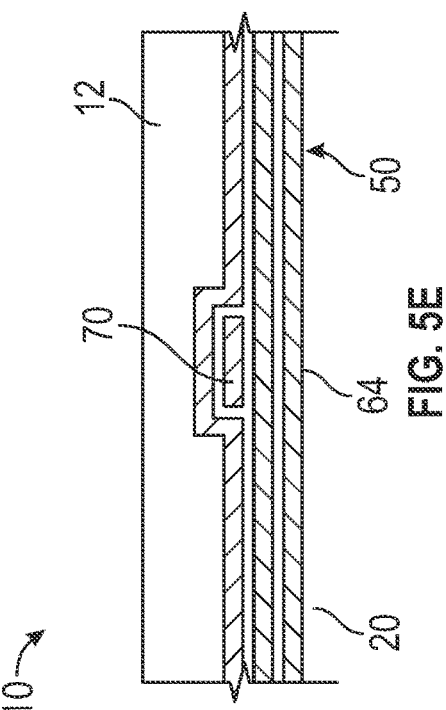
FIG. 5E is a diametrical cross-sectional view of a portion of the end section of the composite drive shaft of FIG. 4, in accordance with another non-limiting example.
Figure 5F:
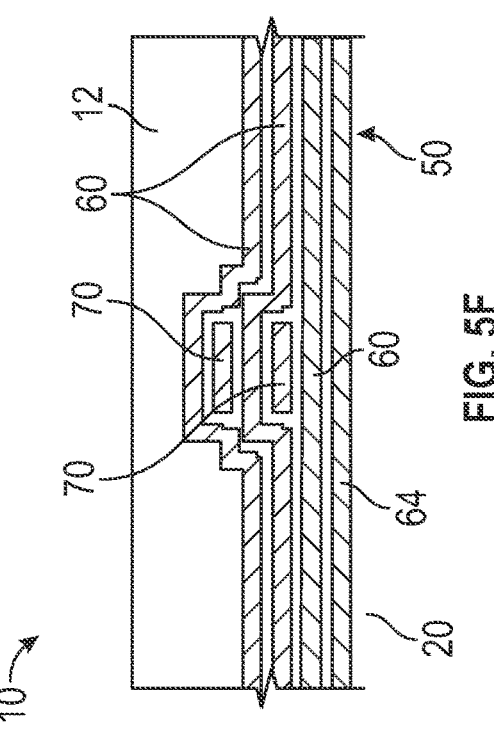
FIG. 5F is a diametrical cross-sectional view of a portion of the end section of the composite drive shaft of FIG. 4, in accordance with a non-limiting example.

Reference will now follow to FIGS. 5A-5H, in describing first composite layup section 50 with an understanding that second composite layup section 52 includes similar structure. Composite layup section 50 may be formed from a first layer 60, a second layer 62, and a third layer 64. Additional layers 70 may also be incorporated into composite layup section 50. Each layer 70 may be repeated in one non-limiting example or may be different in other non-limiting examples. Composite layup section 50 may also include a fifth layer 74 as shown in FIG. 5D. First, second, third, and any additional layers 60, 62, and 70 are arranged in a bi-directional orientation relative to longitudinal axis "A". The term "bi-directional" should be understood to include any angle (+a and –a) that does not lie along longitudinal axis A. As shown in FIG. 5F, composite layup section 50 may be formed from three layers including first layer 60, third layer 64, and periodic or fourth layer 70. First, second, and/or third layer 60, 62, and 64, and or periodic or fourth layer 70 may be arranged in a number of configurations depending upon the type of fiber used and the level and the number of stresses expected to act on first end 12.

Figures 6A, 6B, 6C:
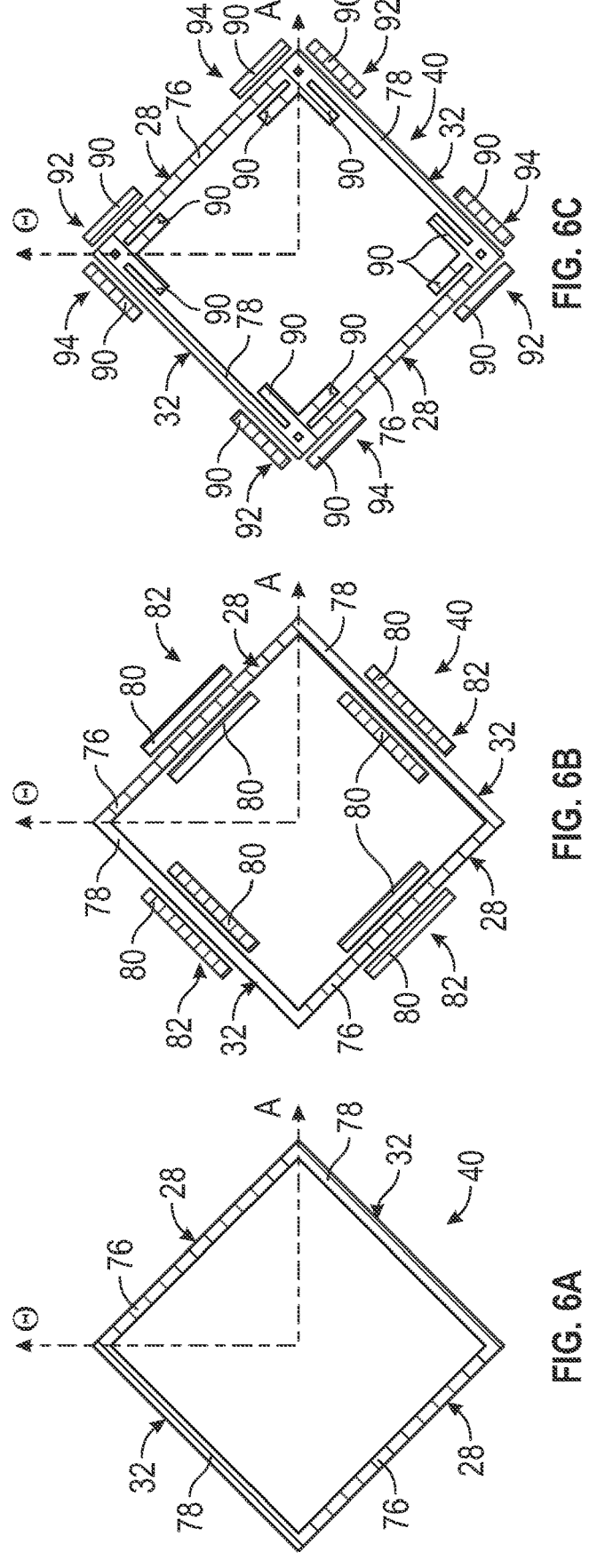
FIG. 6A is a two-dimensional side view of the repeated segment of the spiral net of FIG. 2B having a uniform cross-section, in accordance with a non-limiting example.
FIG. 6B is a two-dimensional side view of the repeated segment of the spiral net of FIG. 2B having an enhanced central portion, in accordance with a non-limiting example.
FIG. 6C is a two-dimensional side view of the repeated segment of the spiral net of FIG. 2B having enhanced end portions, in accordance with a non-limiting example.

Reference will now follow to FIGS. 6A-6C in describing spiral net 40 in accordance with a non-limiting example. In a non-limiting example shown in FIG. 6A, first spiral composite element 28 and second composite spiral element 32 each are form from layers 76 and 78 having a uniform cross-section. In FIG. 6B, first spiral composite element 28 and second composite spiral element 32 include added layers 80 forming a central reinforced region 82, in accordance with a non-limiting example. FIG. 6C depicts first spiral composite element 28 and second composite spiral element 32 as including additional layers 90 forming enhanced end portions 92 and 94, in accordance with another non-limiting example.

Figure 7:
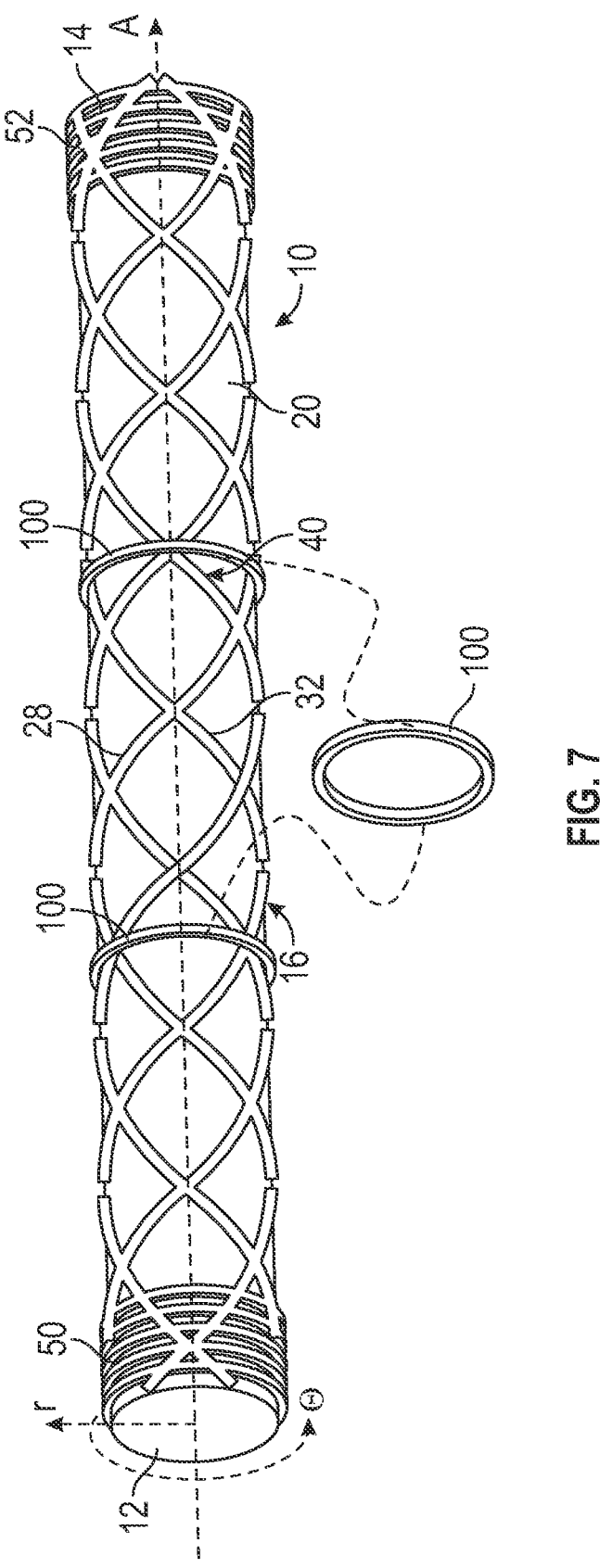
FIG. 7 is a perspective side view of the composite drive shaft of FIG. 1A including rigid composite rings incorporated into the spiral net, in accordance with a non-limiting example.

FIG. 7 depicts composite drive shaft 10 with additional rigid composite rings 100 incorporated into spiral net 40. Composite rings 100 are uni-directionally reinforced in the hoop (circumferential) direction. Composite rings 100 may be spaced along composite drive shaft 10 in order to improve buckling resistance of the shaft. The number, location, and spacing of composite rings 100 may vary. Similarly, reinforced fibers and polymeric matrix may be the same as in the spiral net 40 or different.

7

8

Figure 8:
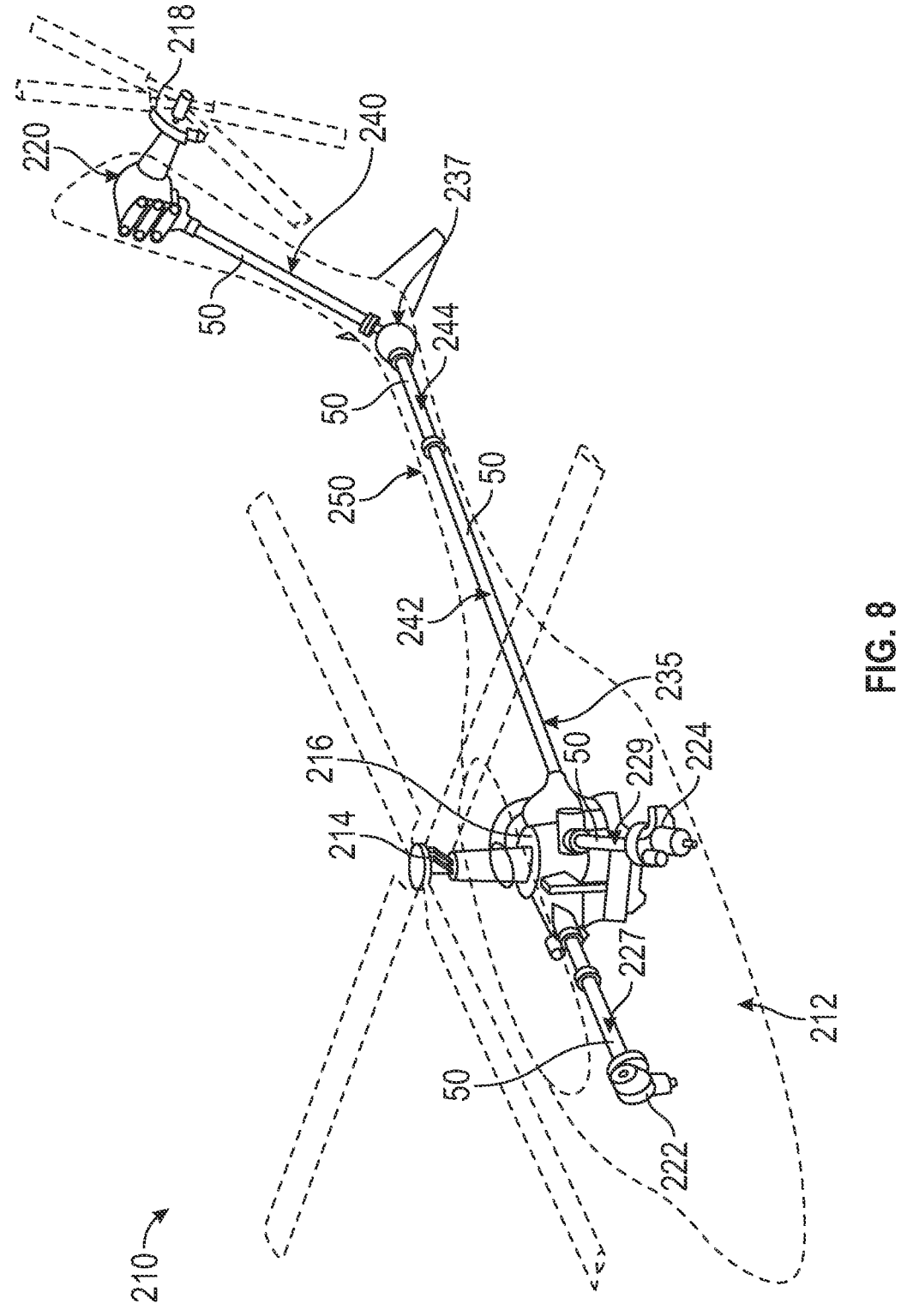
FIG. 8 is a partial glass view of an aircraft including the composite drive shaft, in accordance with a non-limiting example.

In a non-limiting example, composite drive shaft 10 may be incorporated into an aircraft, such as, for example, a rotary wing aircraft indicated generally at 210 in FIG. 8. Aircraft 210 includes a fuselage 212 supporting a first driven system or main rotor 214 coupled to a gearbox 216. A second driven system or tail rotor 218 is connected to a tail rotor gearbox 220. A first drive system, shown in the form of a first engine 222 and a second drive system, shown in the form of a second engine 224 are connected to gearbox 216.

In a non-limiting example, first engine 222 and a second engine 224 are connected to gearbox 216 through a first shaft 227 and a second shaft 229 respectively. A third shaft 235 extends from gearbox 216 toward tail rotor 218. Tail rotor gearbox 220 is connected to a tail rotor gearbox 237 through a fourth shaft 240. In a non-limiting example, third shaft 235 may be formed from multiple shaft sections such as a first shaft section 242 and a second shaft section 244 joined by a flexible coupling. In a non-limiting example, composite drive shaft 50 may be employed to form one or more of first shaft 227, second shaft 229, third shaft 240, and first and second shaft sections 242 and 244.

Figure 9:
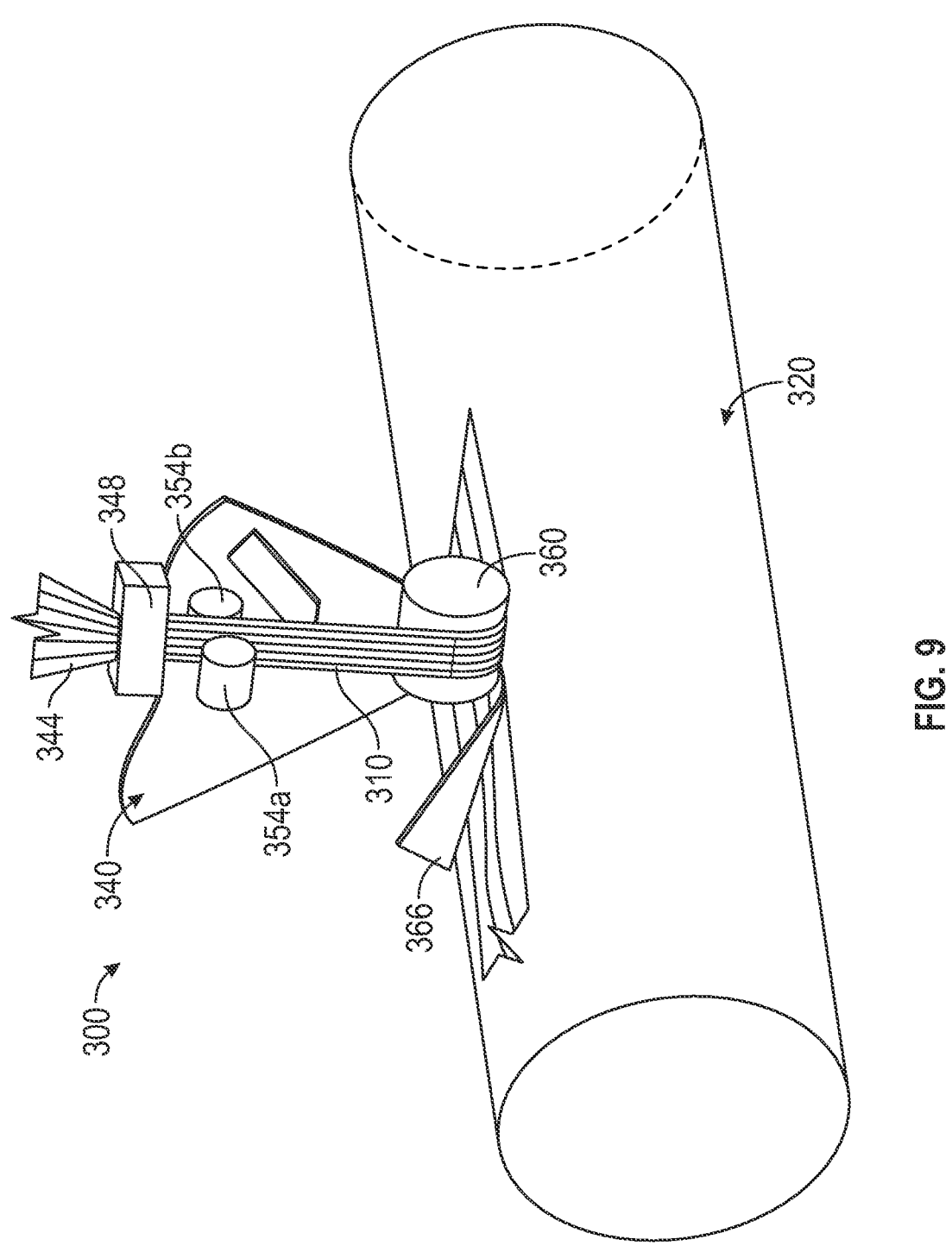
FIG. 9 depicts an automated fiber placement (AFP) system for forming the composite drive shaft, in accordance with a non-limiting example.

As noted herein, composite drive shaft 50 may be formed using a variety of processes. For example, composite drive shaft 50 may be formed by manually layering fibers onto a mandrel and subsequently impregnating those fibers with a resin. Alternatively, composite drive shaft 50 may be formed by an automated fiber placement (AFP) system such as shown at 300 in FIG. 9. AFP system 300 lays a fiber band 310 onto a mandrel 320. AFP system 300 includes a fiber placement head 340 that aligns a plurality of individual fibers or tow in a band collimator 348 to form fiber band 310. Fiber band 310 passes between rollers 354a and 354b, impregnated with resin, and is deposited onto mandrel 320. A compaction roller 360 forces fiber band 310 onto mandrel 320 as a thermal device 366 applies heat as fiber placement head 340 moves along mandrel 320 laying down the resin impregnated fibers that will form composite drive shaft 50.

At this point, it should be understood that the composite drive shaft constructed in accordance with non-limiting embodiments is designed to accommodate stresses, axial tension, axial compression, twisting and combinations thereof without experiences failures. The particular design reduces part costs by eliminating flexible diaphragms, reduces fabrication time, and eliminates the need for high performance precision welds.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A composite drive shaft comprising:
   a shaft portion extending along a longitudinal axis and defining a first end and a second end, the shaft portion having an outer surface;
   a web-based body extending along the longitudinal axis, the web-based body including a first composite layup end section disposed at the first end, a second composite layup end section disposed at the second end, a first spiral composite element extending between the first composite end section and the second composite layup end section, and a second spiral composite element extending between the first composite end section and the second composite layup end section, the first spiral composite element and the second composite spiral element being embedded into the first composite layup end section and the second composite layup end section, the first composite spiral element and the second composite spiral element being arranged in a bi-directional orientation relative to the longitudinal axis, the first spiral composite element and the second spiral composite element are arranged at pre-determined angles and possess a uni-directional fiber-reinforced polymer-matrix composite structure;
   wherein the first spiral composite element and the second spiral composite elements are applied to the outer surface and extend from the first composite layup end section to the second composite layup end section.

2. The composite drive shaft according to claim 1, wherein the pre-determined angle is between about 35° and about 55° relative to the longitudinal axis.

3. The composite drive shaft according to claim 1, wherein each of the first spiral composite element and the second spiral composite element include a uniform cross-section.

4. The composite drive shaft according to claim 1, wherein at least one of the first spiral composite element and the second spiral composite element include a non-uniform cross-section.

5. The composite drive shaft according to claim 1, wherein the first composite layup end and the second composite layup have a bending stiffness along the longitudinal axis that is greater than the bending stiffness along the longitudinal axis of remaining portions of the web-based body.

6. The composite drive shaft according to claim 1, wherein at least one of the first composite layup end and the second composite layup end is formed from at least three distinct fiber orientations.

7. The composite drive shaft according to claim 6, wherein at least one of the at least three distinct fiber orientations has an angle of between about +35° and about +55° relative to the longitudinal axis and another of the at least three distinct fibers has an angle of between about −55° and about −35° relative to the longitudinal axis.

8. The composite drive shaft according to claim 1, wherein the web-based body includes plies overlaid onto plies of the first spiral composite element and the second spiral composite element and plies arranged below the first spiral composite element and the second spiral composite element.

9. The composite drive shaft according to claim 1, further comprising rigid composite rings arranged on the shaft portion, the rigid composite rings being uni-directionally reinforced along a hoop axis.

10. The composite drive shaft according to claim 1, wherein the first composite element is connected to the second spiral composite element through at least one joint.

11. The composite drive shaft according to claim 10, wherein the first spiral composite element is interwoven with the second spiral composite element at the joint.

12. The composite drive shaft according to claim 11, wherein the joint includes a plurality of joints spaced at defined intervals across the web-based body.

13. The composite drive shaft according to claim 11, wherein the joint includes reinforcing pads.

14. The composite drive shaft according to claim 1, wherein at least one of the first spiral composite element and the second spiral composite element is formed from a plurality of fibers.

15. The composite drive shaft according to claim 14, wherein the plurality of fibers include at least one of a carbon fiber, a glass fiber, and an organic fiber.

16. The composite drive shaft according to claim 15, wherein the plurality of fibers is impregnated with a polymer matrix material including one of a thermoplastic matrix and a thermoset matrix.

17. An aircraft including the composite drive shaft according to claim 1.

18. A method of forming the composite drive shaft according to claim 1 comprising:
impregnating fibers with a polymeric matrix;
manually laying the fibers onto a mandrel; and
hardening the fiber band on the mandrel by one of curing a thermoset polymeric matrix and solidifying a thermoplastic polymeric matrix to form the composite drive shaft.

19. A method of forming the composite drive shaft according to claim 1, comprising:
activating an automatic fiber placement (AFP) system;
impregnating a fiber band with a polymeric matrix;
deploying the fiber band onto a mandrel with the AFP system;
depositing the fiber band onto the mandrel to form the composite drive shaft; and
hardening the fiber band on the mandrel by one of curing a thermoset polymeric matrix and solidifying a thermoplastic polymeric matrix to form the composite drive shaft.

* * * * *